US012365593B2

(12) United States Patent
Murashima et al.

(10) Patent No.: US 12,365,593 B2
(45) Date of Patent: Jul. 22, 2025

(54) METHOD FOR PREPARING GRAPHITE FILM

(71) Applicant: KANEKA CORPORATION, Osaka (JP)

(72) Inventors: Kensuke Murashima, Osaka (JP); Mutsuaki Murakami, Osaka (JP)

(73) Assignee: KANEKA CORPORATION, Osaka (JP)

( * ) Notice: Subject to any disclaimer, the term of this patent is extended or adjusted under 35 U.S.C. 154(b) by 545 days.

(21) Appl. No.: 17/945,364

(22) Filed: Sep. 15, 2022

(65) Prior Publication Data
US 2023/0016815 A1 Jan. 19, 2023

Related U.S. Application Data

(63) Continuation of application No. PCT/JP2021/008469, filed on Mar. 4, 2021.

(30) Foreign Application Priority Data

Mar. 27, 2020 (JP) .................................. 2020-057574

(51) Int. Cl.
*C01B 32/205* (2017.01)

(52) U.S. Cl.
CPC ........ *C01B 32/205* (2017.08); *C01B 2204/04* (2013.01); *C01B 2204/22* (2013.01); *C01B 2204/32* (2013.01); *C01P 2006/40* (2013.01)

(58) Field of Classification Search
CPC .............. C01B 32/205; C01B 2204/04; C01B 2204/22; C01B 2204/32; C01B 32/182;

(Continued)

(56) References Cited

U.S. PATENT DOCUMENTS

2017/0355603 A1* 12/2017 Tachibana ............... C01B 32/20
2020/0048097 A1 2/2020 Kobayashi et al.

FOREIGN PATENT DOCUMENTS

CN 109843796 A 6/2019
WO 2016129442 A1 8/2016

OTHER PUBLICATIONS

Murakami, et al., Fabrication of high quality and large area graphite thin films by pyrolysis and graphitization of polyimides, Carbon 2019; 145: 23-30 (Year: 2019).*

(Continued)

*Primary Examiner* — Daniel C. McCracken
(74) *Attorney, Agent, or Firm* — Osha Bergman Watanabe & Burton LLP (57) ABSTRACT

A method for preparing a graphite film includes steps of preparing a carbonized frame carbonized at a temperature Ta, and an aromatic polyimide film or a carbonized film of the aromatic polyimide film carbonized at a temperature Tb, assembling the carbonized frame and the aromatic polyimide film or the carbonized film of the aromatic polyimide film into an intermediary body 1, carbonizing the intermediary body 1 at a temperature Td to produce a carbonized intermediary body, and graphitizing the carbonized intermediary body to produce the graphite film. The temperature Ta is larger than the temperature Tb and the temperature Tb is smaller than the temperature Td. The graphite film has a surface roughness expressed as an arithmetic mean height Sa of less than 18 nm, a thickness of 5 nm or more and less than 10 μm, and an area of 1.0 cm² or more and less than 500 cm².

20 Claims, 3 Drawing Sheets

(58) Field of Classification Search
CPC ... C01B 32/184; C01B 32/186; C01B 32/188; C01B 32/19; C01B 32/192; C01B 32/194; C01B 32/196; C01B 32/198; C01B 2204/00; C01B 2204/02; C01B 2204/06; C01B 2204/065; C01B 2204/20; C01B 2204/24; C01B 2204/26; C01B 2204/28; C01B 2204/30; C01B 32/20; C01B 32/21; C01B 32/215; C01B 32/22; C01B 32/225; C01B 32/23; C01P 2006/40
See application file for complete search history.

(56) References Cited

OTHER PUBLICATIONS

International Search Report issued in corresponding International Application No. PCT/JP2021/008469, mailed May 25, 2021, with translation (5 pages).
Murakami, Mutsuaki, et al., "Fabrication of high quality and large area graphite thin films by pyrolysis and graphitization of polyimides," Carbon 145 (2019), 23-30 (8 pages).
Sone, Junji, et al., "Fundamental study for a graphite-based microelectromechanical system," Micromachines, 2018, 9 (2), 64 (12 pages).
Tatami, Atsushi, et al., "Preparation of Multilayer Graphene Sheets and Their Applications for Particle Accelerators," AIP Conference Proceedings 1962, 030005, 2018 (6 pages).

* cited by examiner

METHOD FOR PREPARING GRAPHITE FILM

TECHNICAL FIELD

One or more embodiments of the present invention relate to a method for preparing a thin graphite film (hereinafter, referred to a graphite film) having smaller surface roughness.

BACKGROUND

The graphite film expectedly has been utilized in a wide field such as a vibrating plate for MEMS, measurement for light intensity distribution with radiation light, a charge converting film, an energy degrader, a fine wiring circuit and the like (Non Patent Documents 1 to 3 and the like).

For example, the graphite film has been prepared by carbonizing and graphitizing an aromatic polymer film such as a polyimide (Non Patent Document 4 and the like). However, the graphite film obtained from the aromatic polymer film shrinks during carbonization and extends during graphitization, and the obtained graphite film has many wrinkles and small projections and depressions on the surface, so that it is difficult to make surface roughness such as arithmetic mean height Sa small.

Patent Document 1 discloses a method for preparing a graphite film by applying a force to a polymer film during carbonization and graphitization such that the polymer film stretches to outside of a polymer film along the film plane, to prepare the graphite film having excellent surface smoothness, thin thickness, and large area.

PATENT DOCUMENT

[Patent Document 1] WO2016/129442

NON PATENT DOCUMENT

[Non Patent Document 1] Micromachines, 2018, 9(2), 64
[Non Patent Document 2] IPAC19 SX-MRPRM
[Non Patent Document 3] AIP Conference Proceedings 1962, 03005 (2018)
[Non Patent Document 4] Carbon 145, (2019) 23-30

However, in the method of Patent Document 1, the polymer film and the carbonized film thereof is easily broken and damaged because a tension is applied to the polymer film as a physical external force, so that it is difficult to prepare a graphite film having very thin thickness and the yield of the graphite film becomes insufficient.

In addition, Patent Document 1 discloses a method for preparing a graphite film by preparing a carbonized frame and a carbonized film at the same carbonization conditions, bonding the carbonized film to the carbonized frame with an adhesive, and baking the carbonized film at a graphitization temperature (Example 65). However, in the above method for graphitizing an assembly of the carbonized frame and the carbonized film as an intermediary body, it is difficult to apply a large tension to the carbonized film and the surface roughness Ra becomes 18 nm or more. The similar method is shown in Comparative Example 4 of the present application in which the graphite film has an arithmetic mean roughness Sa of 30 nm or so.

SUMMARY

Therefore, one or mere embodiments of the present invention provide a method for easily preparing a graphite film having smaller surface roughness.

Specifically, one or more embodiments of the present invention provide a method for preparing a graphite film having smaller surface roughness without applying a physical external force for stretching the polymer film to outside of a polymer film along the film plane during carbonization and graphitization.

As a result, the present inventors have found that the graphite film having smaller surface roughness can be easily prepared by assembling a carbonized frame and a film having different expansion and shrinkage properties from the carbonized frame into an intermediary body, and carbonizing and graphitizing the intermediary body while applying an appropriate tension to the film, to complete one or more embodiments of the present invention.

Specifically, the method for preparing a graphite film according to one or more embodiments of the present invention has the following requirements.

[1] A method for preparing a graphite film comprising steps of:
  preparing a carbonized frame carbonized at a temperature Ta, and an aromatic polyimide film or a carbonized film of the aromatic polyimide film carbonized at a temperature Tb,
  assembling the carbonized frame and the aromatic polyimide film or the carbonized film of the aromatic polyimide film into an intermediary body 1,
  carbonizing the intermediary body 1 at a temperature Td to produce a carbonized intermediary body, and
  graphitizing the carbonized intermediary body to produce the graphite film,
  wherein the temperature Ta is larger than the temperature Tb and the temperature Tb is smaller than the temperature Td, and
  the graphite film has a surface roughness expressed as an arithmetic mean height Sa of less than 18 nm, a thickness of 5 nm or more and less than 10 μm, and an area of 1.0 cm$^2$ more and less than 500 cm$^2$.

[2] The method according to the above [1], wherein the aromatic polyimide film has a thickness of 10 nm or more and less than 20 μm.

[3] A method for preparing a graphite film comprising steps of:
  preparing a carbonized frame carbonized at a temperature Ta and a graphitized film graphitized at a temperature Tc,
  assembling the carbonized frame and the graphitized film into an intermediary body 2, and
  graphitizing the intermediary body 2 at a temperature Te to produce the graphite film,
  wherein the temperature Tc is smaller than the temperature Te, and
  the graphite film has a surface roughness expressed as an arithmetic mean height Sa of less than 18 nm, a thickness of 5 nm or more and less than 10 μm, and an area of 1.0 cm$^2$ or more and less than 500 cm$^2$.

[4] The method according to the above [3], wherein the temperature Tc for graphitization is 2000° C. or higher and 2800° C. or lower.

[5] The method according to any one of the above [1] to [4], wherein the temperature Ta for carbonization is 500° C. or higher and lower than 2000° C.

[6] The method according to any one of the above [1] to [5], wherein the graphite film has an electrical conductivity of 8000 S/cm or more and 26000 S/cm or less in the film direction.

[7] The method according to any one of the above [1] to [6], wherein the carbonized frame is obtained by carbonizing the aromatic polyimide film having a thickness of 10 to 100 μm in an inert gas.

[8] The method according to any one of the above [1] to [7], wherein the intermediary body 1 or the intermediary body 2 is carbonized or graphitized with applying a load to the carbonized frame.

[9] The method according to any one of the above [1] to [8], wherein the carbonized frame extends after the graphitization, compared with the carbonized frame before the graphitization.

According to one or more embodiments of the present invention, the graphite film having smaller surface roughness can be easily prepared.

DETAILED DESCRIPTION

One or more embodiments of the present invention relate to a method for carbonizing and graphitizing an assembly of a carbonized frame and a film having different expansion and shrinkage properties from the carbonized frame as an intermediary body, and one or more embodiments of the present invention comprise a first method and a second method according to kinds of films. The first method contains as the film an aromatic polyimide film or a carbonized film of an aromatic polyimide film in which the degree of the carbonization is lower than the degree of the carbonization of the carbonized frame or a temperature Tb for carbonization in the polyimide film or the carbonized film of an aromatic polyimide is lower than a temperature Ta for carbonization in the carbonized frame. The carbonized film of an aromatic polyimide referred to as a poorly carbonized film in some cases. The first method contains steps of preparing a carbonized frame, and an aromatic polyimide film or a carbonized film of the aromatic polyimide film, assembling the carbonized frame and the aromatic polyimide film or the carbonized film of the aromatic polyimide film into an intermediary body 1, carbonizing the intermediary body 1 to produce a carbonized intermediary body, and graphitizing the carbonized intermediary body to produce the graphite film. When the intermediary body 1 is carbonized, the carbonized frame does not extend and shrink, while the aromatic polyimide film or the carbonized film of the aromatic polyimide film shrinks. As a result, a physical force of a high tension stably can be applied to the aromatic polyimide film or the carbonized film of the aromatic polyimide film, and the surface roughness of the graphite film can be decreased. In addition, when subjecting to the graphitization, both the carbonized frame and the carbonized film extend, and the surface roughness of the graphite film can maintain at a decreased level.

The second method uses an unfinished graphitized film to be assembled with the carbonized frame. The unfinished graphitized film refers to as a poorly graphitized film in some cases. The second method contains steps of preparing a carbonized frame and a poorly graphitized film, assembling the carbonized frame and the poorly graphitized film into an intermediary body 2, and graphitizing the intermediary body 2 to produce the graphite film. When the intermediary body 2 is graphitized, the carbonized frame largely extends to the poorly qraphited film. As a result, a physical force of a high tension can be applied to the poorly graphitized film and the surface roughness of the graphite film can be decreased.

Hereinafter, each of the first method and the second method is explained in detail.

1. Method for Assembling Carbonized Frame and Aromatic Polyimide Film or Poorly Carbonized Film into Intermediary Body 1 (First Method)

1.1 Aromatic Polyimide Film

The aromatic polyimide film is a polymer film obtained from an acid dianhydride and a diamine, and the acid dianhydride is an aromatic acid dianhydride and/or the diamine is an aromatic diamine.

1.1.1 Acid Dianhydride

Examples of the acid dianhydride capable of being used for synthesizing an aromatic polyimide film include a pyromellitic dianhydride (PMDA) 2,3,6,7-naphthalenetetracarboxylic dianhydride, 3,3',4,4'-biphenyltetracarboxylic dianhydride, 1,2,5,6-naphthalenetetracarboxylic dianhydride, 2,2',3,3'-biphenyltetracarboxylic dianhydride, 3,3',4,4'-benzophenonetetracarboxylic dianhydride, 2,2-bis(3,4-dicarboxyphenyl)propane dianhydride, 3,4,9,10-perylenetetracarboxylic dianhydride, bis(3,4-dicarboxyphenyl)propane dianhydride, 1,1-bis(2,3-dicarboxyphenyl)ethane dianhydride, 1,1-bis(3,4-dicarboxyphenyl)ethane dianhydride, bis(2,3-dicarboxyphenyl)methane dianhydride, bis(3,4-dicarboxyphenyl)ethane dianhydride, oxydiphthalic dianhydride, bis(3,4-dicarboxyphenyl)sulfonic dianhydride, p-phenylenebis(trimellitic acid monoester acid anhydride), ethylenebis(trimellitic acid monoester acid anhydride), bisphenol A bis(trimellitic acid monoester acid anhydride), and the like. These dianhydrides may be used singly or maybe used as a mixture formed by mixing these dianhydrides in a certain ratio. Particularly because the more a polyimide film has a polymer structure having a linear and rigid structure, the higher the orientation of the polyimide film becomes, and the graphite film having excellent crystallinity is easily obtained, the pyromellitic dianhydride and 3,3',4,4'-biphenyltetracarboxylic dianhydride are particularly preferred.

1.1.2 Diamine

Examples of the diamine include 4,4'-diaminodiphenyl ether (ODA), p-phenylenediamine (PDA), 4,4'-diaminodiphenyl propane, 4,4'-diaminodiphenyl methane, benzidine, 3,3'-dichlorobenzidine, 4,4'-diaminodiphenyl sulfide, 3,3'-diaminodiphenyl sulfone, 4,4'-diaminodiphenyl sulfone, 4,4'-diaminodiphenyl ether, 3,3'-diaminodiphenyl ether, 3,4'-diaminodiphenyl ether, 1,5-diaminonaphthalene, 4,4'-diaminodiphenyl diethyl silane, 4,4'-diaminodiphenyl silane, 4,4'-diaminodiphenyl ethyl phosphine oxide, 4,4'-diaminodiphenyl-N-methylamine, 4,4'-diaminodiphenyl-N-phenylamine, 1,4-diaminobenzene(p-phenylenediamine), 1,3-diaminobenzene, 1,2-diaminobenzene, and the like. These diamines may be used singly or may be used as a mixture formed by mixing these diamines in a certain ratio. From the viewpoint of enhancing of the orientation of a polyimide film and availability of a graphite film having excellent crystallinity, the diamine may be 4,4'-diaminodiphenyl ether (ODA) or p-phenylenediamine (PDA).

1.1.3 Method for Preparing Polyamic Acid

A method for preparing a polyamic acid can be a known method, and the preferred polymerization method includes the following methods.

1) a method for polymerizing a polyamic acid by reacting an aromatic diamine dissolved in a polar organic solvent and an aromatic tetracarboxylic acid dianhydride in a substantial equimolar.
2) a method for polymerizing a polyamic acid by reacting an aromatic tetracarboxylic acid dianhydride and an aromatic diamine in a very small molar in a polar organic solvent to prepare a prepolymer having acid anhydride groups at both terminals, and adding the aromatic diamine such that the aromatic tetracarboxylic acid dianhydride and the aromatic diamine are a substantial equimolar over all steps.
3) a method for polymerizing a polyamic acid by reacting an aromatic tetracarboxylic acid dianhydride and an aromatic diamine in a very large molar in a polar organic solvent to prepare a prepolymer having amino groups at both terminals, adding the aromatic diamine, and further adding the aromatic tetracarboxylic acid dianhydride such that the aromatic tetracarboxylic acid dianhydride and the aromatic diamine are a substantial equimolar over all steps.
4) a method for polymerizing a polyamic acid by reacting an aromatic tetracarboxylic acid dianhydride dissolved and/or dispersed in a polar organic solvent and an aromatic diamine a in a substantial equimolar.
5) a method for polymerizing a polyamic acid by reacting a mixture of an aromatic tetracarboxylic acid dianhydride and an aromatic diamine in a substantial equimolar in a polar organic solvent.

As a method for producing a polyamic acid from the acid dianhydride and the diamine, the polyamic acid is usually produced by dissolving at least one of the aromatic acid dianhydrides and at least one of the diamines in an organic solvent, and stirring the organic solvent solution of the polyamic acid in a controlled temperature condition until polymerization of the above-mentioned acid dianhydride and diamine is completed. These polyamic acid solutions are commonly produced with a concentration in 5 to 35% by weight, preferably 10 to 30% by weight. When the solution has a concentration in this range, it is possible to achieve an appropriate molecular weight and an appropriate solution viscosity. When a concentration of the polyamic acid is too lower, the molecular weight of the polyamic acid is not sufficient, the strength of the polyimide film is not sufficient in same cases. In addition, a viscosity of the solution is too lower and the formation of the polyimide film becomes difficult in some cases. On the other hand, when a concentration of the polyamic acid is too higher, the viscosity becomes very high and the formation of the polyimide film becomes difficult.

The acid dianhydride and the diamine in the polyamic acid solution may be substantially equal in molar amount to each other, and a mole ratio (acid dianhydride:diamine) is, for example, 1.5:1 to 1:1.5, preferably 1.2:1 to 1:1.2, and more preferably 1.1:1 to 1:1.1.

A solvent for preparing the polyamic acid may be amide solvent such as N,N-dimethylformamide (DMF), N,N-dimethylacetoamide, N-methyl-2-pyrrolidone and the like. Among these, N,N-dimethylformamide (DMF), N,N-dinethylacetoamide are particularly preferred.

Examples of a method for producing a polyimide include a thermal curing method in which polyamic acid of a precursor is imidized by heating, and a chemically curing method in which both or one of a dehydrating agent typified by acid anhydrides such as acetic anhydride and tertiary amines such as picoline, quinoline, isoquinoline and pyridine is used as an imidization accelerator for polyamic acid to perform imidization. In one or more embodiments of the present invention, the polyimide may be prepared by the thermal curing method or the chemically curing method, or the combination of the thermal curing method and the chemically curing method. The chemically curing method is preferred in order to not break the graphite film even if the tension is applied to the polyimide film during carbonization and graphitization and easily obtain a graphite film having a good quality of the high electric conductivity. On the other hand, since the imidization is easily promoted by heating of the polyamic acid, the thermal curing method can be easily used in the case where the polyimide is formed over time and can be easily applied to a various method for producing the polyimide such as spin coating, so that the thermal curing method has an advantage that the free degree is high in the production process.

Specifically, a method for producing a polyimide film by the chemically curing method is as follows. First, to the organic solvent solution of the polyamic acid, a stoichiometric amount or more of a dehydrating agent and a catalytic amount of an imidization accelerator are added, and the resulting mixture is cast or applied onto a supporting plate such as aluminum foil, a polymer film such as PET, or a support such as a drum or an endless belt to form a film, and a film having a self-supporting property is obtained by heating and evaporating an organic solvent. Then, the obtained film is imidized while further heating to dry to obtain a polyimide film. A temperature during heating may be in a range of 150° C. or higher and lower than 500° C. On the other hand, in the thermal curing method, the imidization accelerator is not added, the imidization is carried out by heating to obtain the polyimide film. In this case, a temperature during heating may be in a range of 150° C. or higher and lower than 500° C.

Moreover, a production process of a polyimide may include a step of fixing or stretching a polyimide film. The fixation or the stretch of the polyimide film can result in the prevention of the shrinkage of the polyimide and the improvement of the orientation of the polymer chain along with a film direction. When the polyimide film having high orientation in the film direction is used, the graphite film having high crystallinity and excellent electrical conductivity can be easily obtained.

1.1.4 Thickness of Aromatic Polyimide Film

The aromatic polyimide film has a thickness of, for example, 10 nm or more and less than 20 μm. The thickness of finally obtained graphite film is about 50% of the thickness of the aromatic polyimide film, and the thickness of the graphite film can be controlled in a desirable range by selecting the thickness of the aromatic polyimide film from the above range. In one or more embodiments of the present invention, the graphite film having very thin thickness can be prepared because the aromatic polyimide film can be graphitized with applying a tension to the aromatic polyimide film without stress concentration. From this viewpoint, the aromatic polyimide film may have a thickness of 1 μm or less, 300 nm or less, 100 nm or less, or 50 nm or less.

1.2 Poorly Carbonized Film 1.2.1 Preparation of Poorly Carbonized Film

The poorly carbonized film is prepared by heating the aromatic polyimide film in an inert gas or vacuum and carbonizing the aromatic polyimide film. The inert gas may be nitrogen, argon or a mixed gas of argon and nitrogen.

The poorly carbonized film may be a carbonized film prepared at a lower temperature than the temperature for carbonization of the intermediary body 1.

The temperature Tb for carbonization is lower than the temperature Ta for carbonization in which the carbonized frame is prepared as set forth below. When the temperature Tb for carbonization is lower than the temperature Ta for carbonization and the intermediary body 1 is carbonized, the shrinkage of the poorly carbonized film becomes large than the shrinkage of the carbonized frame, and a physical force of a large tension can be applied to the poorly carbonized film. A value of the temperature Tb—the temperature Ta is, for example, lower than 0° C. and −1100° C. or higher, preferably lower than 0° C. and −800° C. or higher, more preferably −100° C. or lower, further preferably −300° C. or lower, and particularly preferably −500° C. or lower.

In the preparation of the poorly carbonized film, the temperature Tb for carbonization is lower than a temperature Td for carbonization in the intermediary body 1 as set forth below. When the temperature Tb is lower than the temperature Td, the poorly carbonized film can shrink during the carbonization of the intermediary body 1, and a physical force of a large tension can be applied to the poorly carbonized film.

The temperature Tb for carbonization is, for example, 500° C. to 1500° C. The temperature Tb for carbonization may be 520° C. or higher, 550° C. or higher, 560° C. or higher, 570° C. or higher, 580° C. or higher, 1300° C. or lower, 1000° C. or lower, 900° C. or lower, 700° C. or lower, or 600° C. or lower. When the temperature Tb for carbonization is lower than 400° C., the film is considered to be the aromatic polyimide film and is not considered to be the carbonized film.

The rate for increasing a temperature to the temperature Tb for carbonization is, for example, 2 to 30° C./minute, and preferably 5 to 20° C./minute. The time for keeping the temperature Tb for carbonization is, for example, 20 minutes to 5 hours, and preferably 40 minutes to 3 hours.

1.2.2 Thickness of Poorly Carbonized Film

The thickness of the poorly carbonized film may be 78 to 100%, 80 to 99%, 85 to 98%, 90 to 97%, 92 to 96%, or 94 to 95%, of the thickness of the aromatic polyimide film.

That is, the poorly carbonized film may have a thickness of 7.8 nm or more and less than 20 μm, 8.0 nm or more and 19.8 μm or less, 8.5 nm or more and 19.6 μm or less, 9.0 nm or more and 19.4 μm or less, 9.2 nm or more and 19.2 μm or less, or 9.4 nm or more and 19.0 μm or less.

1.3 Carbonized Frame

Figure 1:
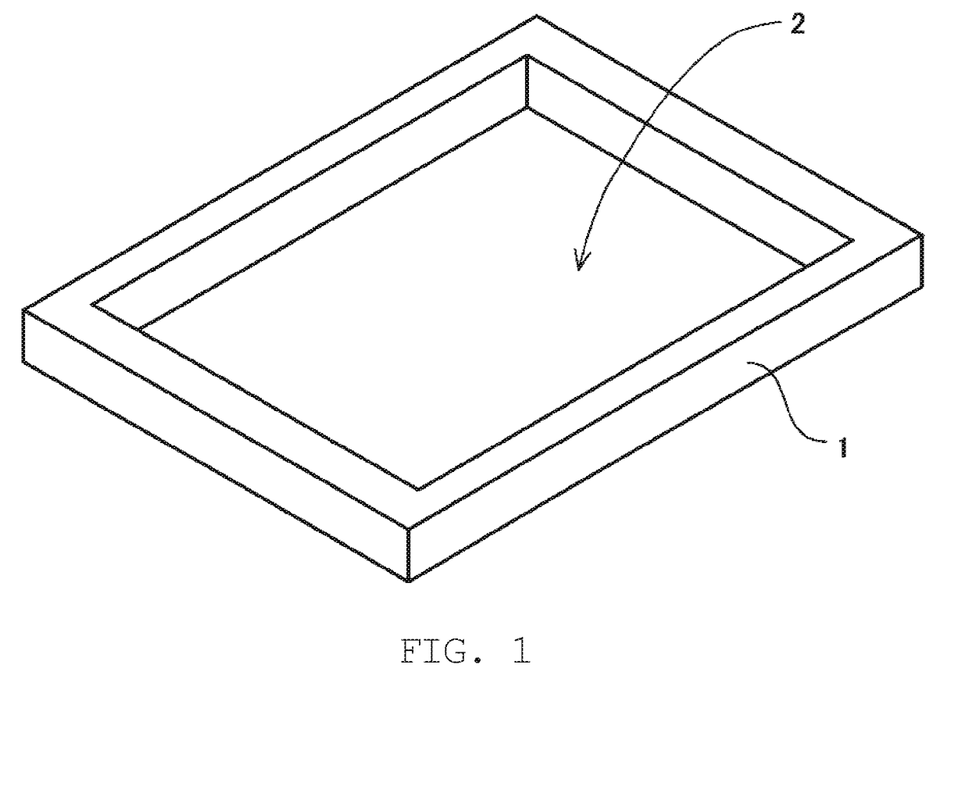
FIG. 1 is a schematic perspective view showing an example of a carbonized frame used in one or more embodiments of the present invention.
Figure 2:
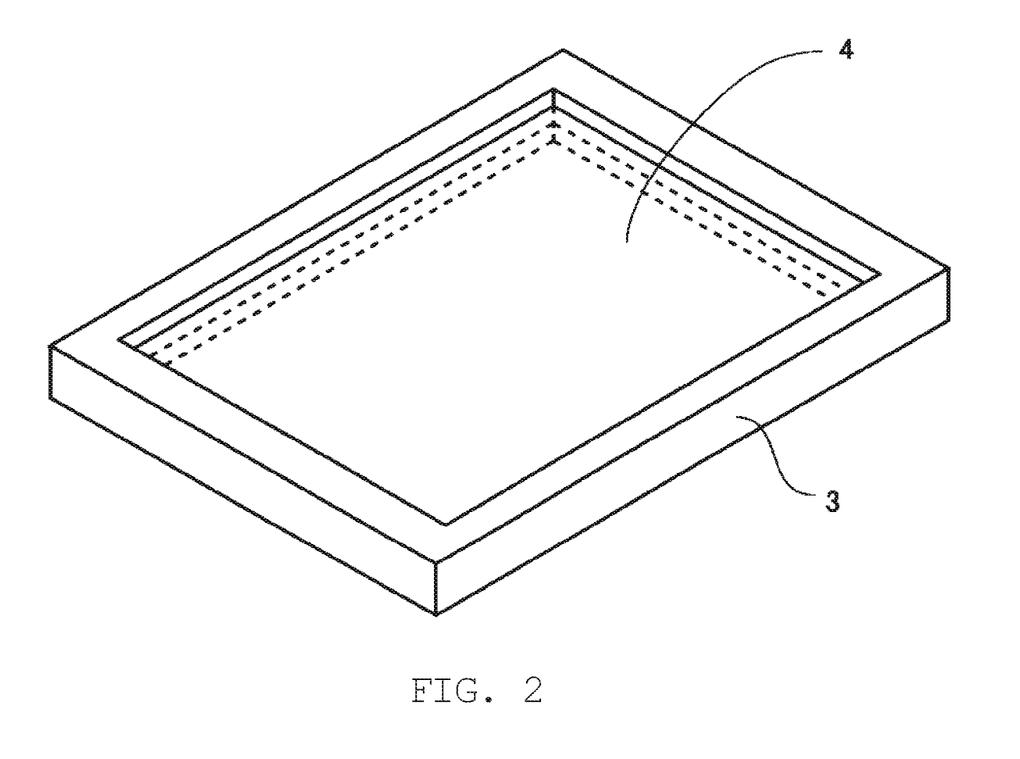
FIG. 2 is a schematic perspective view showing other example of a carbonized frame.

The carbonized frame may be a frame having a size along with an outer circumference of the aromatic polyimide film, the poorly carbonized film, or the poorly graphitized film. As shown in FIG. 1 which is a schematic perspective view, frame (carbonized frame) 1 indicates a member surrounding a circumference of space 2. Frame 1 has space 2 which is hollow inside frame 1, and as shown in FIG. 2, frame 1 may be frame 3 in which at least one plane or an inner of frame is solid body 4. In the case of both frame 1 having space 2 and frame 3 having solid body 4, frame 1 or frame 3 and the film such as the aromatic polyimide film, the poorly carbonized film, or the poorly graphitized film is assembled or laminated, while the inside of frame 1 or frame 3 and the film is not assembled or laminated. In this case, the film independently can shrink and extend while the carbonized frame shrinks and extends, so that the surface roughness of the film can be decreased. The carbonized frame may be a frame having a hollow part inside the frame because the film is not interfered from other and the adverse effects from the carbonization and the graphitization can be avoided. The shape of the carbonized frame includes square, rectangle, hexagon, circle, oval and the like, and the shape of the carbonized frame may be a circle. When the carbonized frame has shapes of square, rectangle, or hexagon, corners may have roundness.

The carbonized frame means a frame body obtained by carbonizing the aromatic polyimide film. The aromatic polyimide film may be obtained by using components, conditions, and combination thereof for the aromatic polyimide explained in the above aromatic polyimide film. The carbonized frame may be those obtained by carbonizing the aromatic polyimide film having a frame shape, or carbonizing the aromatic polyimide film having a plane shape and then cutting into a frame shape.

In order to obtain the carbonized frame, the temperature Ta for carbonization of the aromatic polyimide film is, for example, 500° C. or higher, preferably 800° C. or higher, more preferably 900° C. or higher, and for example, lower than 2000° C., preferably 1800° C. or lower, more preferably 1500° C. or lower, and further preferably 1200° C. or lower. Conditions for carbonization such as atmosphere, a rate for increasing a temperature, time for maintaining a temperature other than the temperature Ta for carbonization is the same as those of the poorly carbonized film as mentioned above.

The aromatic polyimide film used in the carbonized frame has a thickness of, for example, 10 μm or more, preferably 15 μm or more, more preferably 20 μm or more, and, for example, 100 μm or less, preferably 60 μm or less, and more preferably 40 μm or less. The carbonized frame has a thickness of, for example, 9 μm or more, preferably 13.5 μm or more, more preferably 18 μm or more, and, for example, 90 μm or less, preferably 54 μm or less, and more preferably 36 μm or less.

The size of the carbonized frame such as a size (for example, a diameter, a length of a side) of an outer circumference part may be equal to or greater than sizes (for example, a diameter, a length of a side) of an outer circumference part of the aromatic polyimide film, the poorly carbonized film, or the poorly graphitized film.

An outer size and a width of an inner size of the carbonized frame is, for example, 0.5 to 12 cm, preferably 1 to 10 cm, more preferably 2 to 8 cm, and further preferably 3 to 6 cm.

1.4 Assembly of Carbonized Frame and Aromatic Polyimide Film or Poorly Carbonized Film into Intermediary Body 1

A method for assembling the aromatic polyimide film or the poorly carbonized film and the carbonized frame into an intermediary body 1 includes a method for sandwiching the film with the frame, a method for sewing the film and the frame using a graphite string, a method for sticking a pin made of a graphite through the film and the frame, a method for laminating the film and the frame using an adhesive, a method for laminating the film and the frame using as an adhesive a melted polymer, a method for laminating the film and the frame using as an adhesive a polymer solution to be coated and dried, and a method for laminating the film and the frame using as an adhesive a polyamic acid to be coated, dried, heated, and imidized, and the like.

Among these, the assembly of the aromatic polyimide film or the poorly carbonized film and the carbonized frame into the intermediary body 1 may be a direct contact of the aromatic polyimide film or the poorly carbonized film and the carbonized frame without using an adhesive layer composed of an adhesive and the like, and other material, and may be a laminate composed of the aromatic polyimide film or the poorly carbonized film and the carbonized frame.

Figure 3:
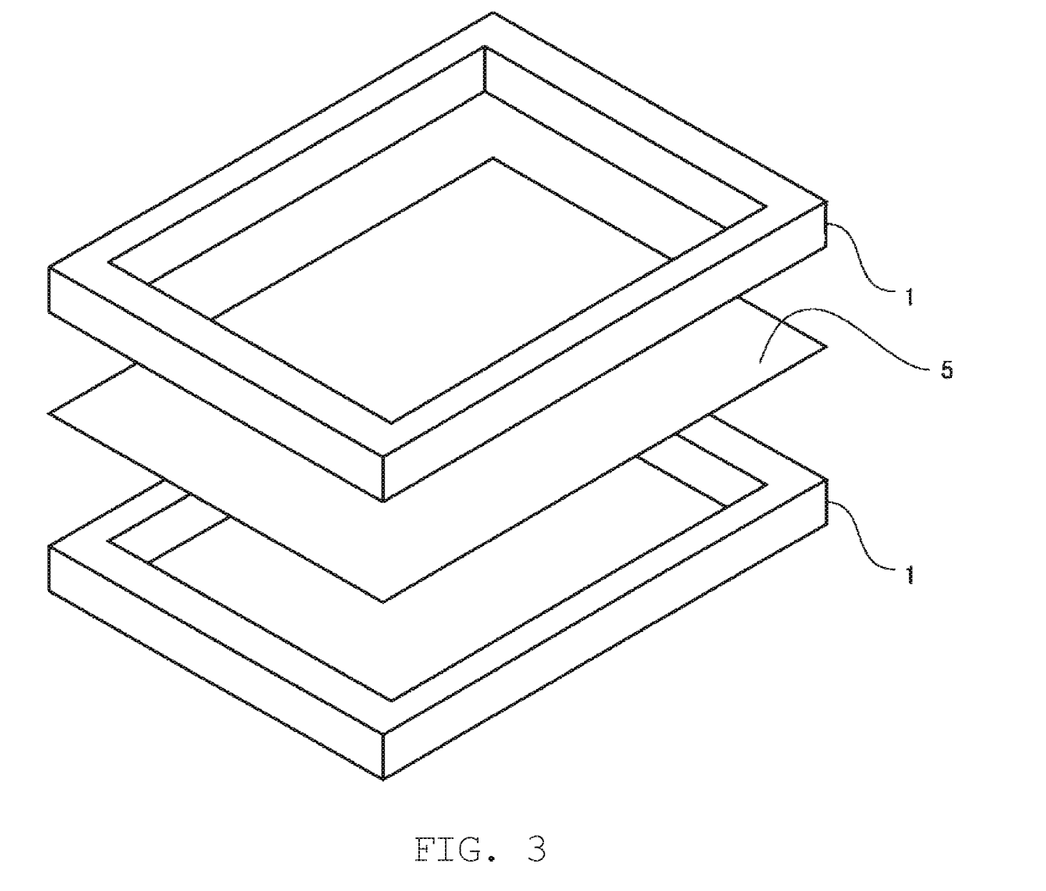
FIG. 3 is a schematic disassembled perspective view showing an example of an assembly of a carbonized frame and a film such as an aromatic polyimide film, a poorly carbonized film, or a poorly graphitized film.

As shown in FIG. 3, the aromatic polyimide film or the poorly carbonized film and the carbonized frame may be assembled by depositing frame 1 on front side and back side of film 5 such as the aromatic polyimide film, the poorly carbonized film, or the poorly graphitized film, and sandwiching film 5 with frame 1, if necessary applying a load to frame 1.

When the intermediary body 1 is carbonized and graphitized with applying a load to frame 1, the distortion of frame can be prevented. The load to be applied to frame is, for example, 0.1 to 10 kgf/cm$^2$, preferably 0.3 to 5 kgf/cm$^2$, and more preferably 0.5 to 3 kgf/cm$^2$.

The number of the aromatic polyimide film or the poorly carbonized film may be one or two or more as long as these satisfy a given thickness, and the number of the aromatic polyimide film or the poorly carbonized film may be one.

1.5 Carbonization of Intermediary Body 1

The intermediary body 1 is carbonized at a given temperature Td for carbonization. By this, the carbonization of the aromatic polyimide film or the poorly carbonized film processes relative to the carbonized frame, the shrinkage of the aromatic polyimide film or the poorly carbonized film is occurred at a large degree, so that the surface roughness of the finally obtained graphite film can be decreased by affecting a tension to the film.

The temperature Td for carbonization of the intermediary body 1 is, for example, 800° C. or higher, and preferably 900° C. or higher, and, for example, 1800° C. or lower, preferably 1500° C. or lower, and more preferably 1200° C. or lower. It is preferable that the temperature Td for carbonization of the intermediary body 1 is not much high relative to the temperature Ta for carbonization of the carbonized frame. In the case where the value of the temperature Td—the temperature Ta is small, the shrinkage of the carbonized frame can be prevented during the carbonization of the intermediary body 1, and a sufficient tension can be loaded to the aromatic polyimide film or the poorly carbonized film. A value of the temperature Td—the temperature Ta is, for example, 300° C. or lower, preferably 200° C. or lower, more preferably 100° C. or lower, and particularly preferably 0° C. or lower. The value of the temperature Td—the temperature Ta may be a negative value as long as the temperature Td is greater than a given temperature and given carbonization processes. The value of the temperature Td—the temperature Ta is, for example, −800° C. or higher, preferably −500° C. or higher, more preferably −200° C. or higher, and particularly preferably −100° C. or higher.

Conditions for carbonization such as atmosphere, rate for increasing a temperature, time for maintaining a temperature other than the temperature Td for carbonization is the same as those of the poorly carbonized film as mentioned above.

1.6 Graphitization of Carbonized Intermediary Body 1

The carbonized intermediary body 1 is set into a graphitizing furnace and is subjected to the graphitization. In the graphitization, the carbonized film extends and the carbonized frame also extends. By this, the formation of wrinkles and unevenness on the surface of the film can be prevented in the graphitization.

The graphitization is carried out in an inert gas. The inert gas may be argon or a mixed gas of argon and helium in a small amount. The pressure (gauge pressure) of the inert gas atmosphere is, for example, 0.01 MPa or more, preferably 0.03 MPa or more, and more preferably 0.05 MPa or more, and, for example, 1 MPa or less, preferably 0.5 MPa or less, and more preferably 0.3 MPa or less.

The temperature Te for graphitization is, for example, 2200° C. or higher, preferably 2600° C. or higher, and more preferably 2800° C. or higher, and for example, 3300° C., or lower, preferably 3200° C. or lower, and more preferably 3000° C. or lower.

The rate for increasing a temperature to the temperature Te for graphitization is, for example, 5 to 40° C./minute, and preferably 10 to 30° C./minute. The time for keeping the temperature Te for graphitization is, for example, 5 minutes to 3 hours, and preferably 15 minutes to 1 hour.

2. Method for Assembling Carbonized Frame and Poorly Graphitized Film into Intermediary Body 2 (Second Method)

2.1 Poorly Graphitized Film

The poorly graphitized film is a film obtained by carbonizing the aromatic polyimide film, and graphitizing a carbonized film thereof. The temperature Tb' for carbonization can be selected from the rage of 800 to 800° C. Conditions for carbonization such as atmosphere, a rate of increasing a temperature, time of maintaining a temperature other than the temperature Tb' for carbonization is the same as those of the poorly carbonized film as mentioned above.

The poorly graphitized film also means a film graphitized at a lower temperature than the temperature for graphitization in the intermediary body 2.

In the preparation of the poorly graphitized film, the temperature Tc for graphitization is lower than the temperature Te for graphitization of the intermediary body 2. When the temperature Tc for graphitization is lower than the temperature Te for graphitization of the intermediary body 2, the graphitization of the poorly graphitized film can process in the graphitization of the intermediary body 2. In this case, the poorly graphitized film extends, while the carbonized frame further extends. Therefore, the surface roughness of the graphite film can be decreased by promoting the graphitization while the tension is applied to the poorly graphitized film. A value of the temperature Tc—the temperature Te is, for example, −100° C. or lower and −800° C. or higher, preferably −200° C. or lower, more preferably −300° C. or lower, and further preferably −400° C. or lower.

The temperature Tc for graphitization is, for example, 2000° C. or higher, preferably 2200° C. or higher, more preferably 2300° C. or higher, and, for example, 2800° C. or lower, preferably 2600° C. or lower, and more preferably 2500° C. or lower.

Conditions for graphitization such as atmosphere, pressure, rate for increasing a temperature, time for maintaining a temperature other than the temperature Tc for graphitization is the same as those of the graphitization of the intermediary body 2.

The poorly graphitized film has a thickness of, for example, 5 µm or less, preferably 1 µm or less, more preferably 500 nm or less, further preferably 250 nm or less, further more preferably 100 nm or less, and particularly preferably 50 nm or less, and, for example, 1 nm or more, preferably 2 nm or more, and more preferably 5 nm or more.

2.2 Graphitization of Assembly of Carbonized Frame and Poorly Graphitized Film (Intermediary Body 2)

The carbonized frame used in the second method is the same as the carbonized frame used in the first method. For the assembly of the carbonized frame and the poorly graphitized film into the intermediary body 2, the same method as in the first method can be used. The graphitization of the intermediary body 2 of the second method is the same as the graphitization of the intermediary body of the first method. The applying a load to the carbonized frame is preferred in the second method in the same way as the first method.

3. Graphite Film

The obtained graphite film has remarkably decreased surface roughness. The graphite film has an arithmetic mean height of less than 18 nm, preferably 15 nm or less, more preferably 12 nm or less, further preferably 9 nm or less, and particularly preferably 6 nm or less. The lower limit of the arithmetic mean height is not particularly limited, and can be about 1 nm or about 0.1 nm in one or more embodiments of the present invention.

The arithmetic mean height Sa may be calculated on the basis of ISO 25178. Measurement equipment includes surface roughness meter with a contact needle, razer microscope, scan tunnel microscopy (STM), atomic force microscope (AFM), scanning probe microscope (SPM) and the like.

The graphite film has an area of, for example, 1.0 $cm^2$ or more and less than 500 $cm^2$, preferably 5 to 400 $cm^2$, and more preferably 10 to 300 $cm^2$. The shape of the graphite film is square, rectangle, hexagon, circle, oval and the like. Among these, the graphite film preferably has the circle shape.

The graphite film has a thickness of 5 nm or more and less than 10 µm. In one or more embodiments of the present invention, the graphite film having very thin thickness can be prepared because the film can be graphitized with applying a tension to the film without stress concentration. Therefore, the graphite film may have a thickness of 500 nm or less, 150 nm or less, 50 nm or less, or 25 nm or less.

The graphite film has an electrical conductivity of a film direction of, for example, 8000 to 26000 S/cm, preferably 16000 to 26000 S/cm, and more preferably 20000 to 26000 S/cm.

The electrical conductivity of the graphite film can be measured by the van Der Pauw method, and the electrical conductivity can be measured using, for example, Resistivity/DC & AC Hall measurement system, RESITest 8300 manufactured by TOYO Corporation.

The present application claims for priority of Japanese Patent Application No. 2020-057574 filed on Mar. 27, 2020. The entire contents of specifications of Japanese Patent Application No. 2020-057574 filed on Mar. 27, 2020 is incorporated by reference.

EXAMPLES

Next, one or more embodiments of the present invention will be described in detail with reference to Examples and Comparative Example, but one or more embodiments of the present invention are not limited thereto, and the variation and the modification of one or more embodiments of the present invention without departing the gist described above and below are all included the technical scope of one or more embodiments of the present invention.

1. Method for Evaluation

Physical properties of graphite films obtained in the following Example and Comparative Example were evaluated as follows.

(1) Electrical Conductivity

The electrical conductivity of the graphite film was measured by a Van der Pauw method. In the preparation of a test piece, the test piece was cut into a square shape having a size of 5×5 $mm^2$, and a silver paste electrode was attached to each of four corners. Measurement was carried out with Resistivity/DC & AC Hall measurement system, RESITest 8300 manufactured by TOYO Corporation.

(2) Surface Roughness and Thickness

A graphite film was transfer to a glass substrate by softly pressing on the glass substrate. Surface roughness (arithmetic mean height Sa: ISO 25178) and step between the graphite film and the glass substrate (thickness of graphite film) were measured by using a scanning probe microscope (SPM).

2. Preparation of Polyimide Film

Manufacture Example 1

A polyimide film was prepared as follows. Into 100 g of a 18% by weight dimethyl formamide (DMF) solution of polyamic acid synthesized from pyromellitic dianhydride and 4,4'-diaminodiphenyl ether in the mole ratio of 1:1, a curing agent composed of 20 g of acetic anhydride and 10 g of isoquinoline were mixed, and the resulting mixture was stirred, defoamed by centrifugal separation, and then applied by casting onto an aluminum foil, and the polyamic acid films having uniform thicknesses in a range of 0.04 µm to 25 µm were prepared using a spin coater. The thickness of the polyamic acid film was adjusted by changing a concentrate of the polyamic acid solution and a rotational speed of the spin coater. A laminate of the aluminum foil and the polyamic acid solution was heated at 120° C. for 150 seconds, at 250° C. for 60 seconds, at 450° C. for 60 seconds, and then the aluminum foil was removed to prepare five polyimide films (A-0.04: 0.04 µm, A-0.4: 0.4 µm, A-2.2: 2.2 µm, A-4.0: 4.0 µm, A-25: 25 µm, respectively).

3. Preparation of Carbonized Frame

Manufacture Example 2

Each of three polyimide films (A-25) which was cut into a ring shape having an outer diameter of 8 cm and an inner diameter of 4 cm was heated to 150° C., 1000° C., or 1500° C. at a rate of 10° C./minute using an electric furnace in a nitrogen gas, kept each of maximum temperatures for one hour, and was carbonized to obtain three carbonized frames (B-750, B-1000, B-1500).

4. Preparation of Graphite Film

Example 1: Preparation of Graphite Film (C-1)

A polyimide film (A-0.04) which was cut into a circle shape having a diameter of 8 cm and had a thickness of 0.04 µm was sandwiched between the carbonized frames (B-1000) from both sides to prepare an assembly of the carbonized frame and the polyimide film as an intermediary body. The intermediary body was heated to 1000° C. at a rate of 0° C./minute using an electric furnace in a nitrogen gas while a load of 1.0 kgf/$cm^2$ was applied, kept 1000° C. for one hour, and was carbonized to obtain a carbonized intermediary body.

Then, the carbonized film was set into a graphitizing furnace together with the carbonized frame, was heated to 2900° C. at a rate of 20° C./minute in an argon gas atmosphere while a gauge pressure of 0.10 MPa (1.0 kgf/$cm^2$) was applied, kept 2900° C. for 30 minutes, and the temperature was decreased at a rate of 40° C./minute to obtain a graphite film (C-1).

Example 2: Preparation of Graphite Film (C-2)

A polyimide film (A-0.04) which was cut into a circle shape having a diameter of 8 cm and had a thickness of 0.04 µm was heated at 500° C. at a rate of 10° C./minute using an electric furnace in a nitrogen gas, kept 500° C. for one hour, and then naturally cooled. The resultant film was sandwiched between the carbonized frames (B-750) from both sides to prepare an assembly of the carbonized frame and the polyimide film as an intermediary body. The intermediary body was heated to 1000° C. at a rate of 10° C./minute using an electric furnace in a nitrogen gas while a load of 1.0 kgf/cm$^2$ was applied, kept 1000° C. for one hour, and was carbonized to obtain a carbonized intermediary body.

Then, the carbonized film was set into a graphitizing furnace together with the carbonized frame, was heated to 2900° C. at a rate of 20° C./minute in an argon gas atmosphere while a gauge pressure of 0.10 MPa (1.0 kgf/cm$^2$) was applied, kept 2900° C. for 30 minutes, and the temperature was decreased at a rate of 40° C./minute to obtain a graphite film (C-2).

Example 3: Preparation of Graphite Film (C-3)

A polyimide film (A-0.04) which was cut into a circle shape having a diameter of 8 cm and had a thickness of 0.04 μm was heated at 500° C. at a rate one 10° C./minute using an electric furnace in a nitrogen gas, kept 500° C. for one hour, and then naturally cooled. The resultant film was sandwiched between the carbonized frames (B-1000) from both sides to prepare an assembly of the carbonized frame and the polyimide film as an intermediary body. The intermediary body was heated to 1000° C. at a rate of 10° C./minute using an electric furnace in a nitrogen gas while a load of 1.0 kgf/cm$^2$ was applied, kept 1000° C. for one hour, and was carbonized to obtain a carbonized intermediary body.

Then, the carbonized film was set into a graphitizing furnace together with the carbonized frame, was heated to 2900° C. at a rate of 20° C./minute in an argon gas atmosphere while a gauge pressure of 0.10 MPa (1.0 kgf/cm$^2$) was applied, kept 2900° C. for 30 minutes and the temperature was decreased at a rate of 40° C./minute to obtain a graphite film (C-3).

Example 4: Preparation of Graphite Film (C-4)

A polyimide film (A-0.04) which was cut into a circle shape having a diameter of 8 cm and had a thickness of 0.04 μm was heated at 500° C. at a rate of 10° C./minute using an electric furnace in a nitrogen gas, kept 500° C. for one hour, and then naturally cooled. The resultant film was sandwiched between the carbonized frames (B-1500) from both sides to prepare an assembly of the carbonized frame and the polyimide film as an intermediary body. The intermediary body was heated to 1000° C. at a rate of 10° C./minute using an electric furnace in a nitrogen gas while a load of 1.0 kgf/cm$^2$ was applied, kept 1000° C. for one hour, and was carbonized to obtain a carbonized intermediary body.

Then, the carbonized film was set into a graphitizing furnace together with the carbonized frame, was heated to 2900° C. at a rate of 20° C./minute in an argon gas atmosphere while a gauge pressure of 0.10 MPa (1.0 kgf/cm$^2$) was applied, kept 2900° C. for 30 minutes, and the temperature was decreased at a rate of 40° C./minute to obtain a graphite film (C-4).

Example 5: Preparation of Graphite Film (C-5)

A polyimide film (A-0.04) which was cut into a circle shape having a diameter of 8 cm and had a thickness of 0.04 μm was heated at 600° C. at a rate of 10° C./minute using an electric furnace in a nitrogen gas, kept 600° C. for one hour, and then naturally cooled. The resultant film was sandwiched between the carbonized frames (B-1000) from both sides prepare an assembly of the carbonized frame and the polyimide film as an intermediary body. The intermediary body was heated to 1000° C. at a rate of 10° C./minute using an electric furnace in a nitrogen gas while a load of 1.0 kgf/cm$^2$ was applied, kept 1000° C. for one hour, and was carbonized to obtain a carbonized intermediary body.

Then, the carbonized film was set into a graphitizing furnace together with the carbonized frame, was heated to 2900° C. at a rate of 20° C./minute in an argon gas atmosphere while a gauge pressure of 0.10 MPa (1.0 kgf/cm$^2$) was applied, kept 2900° C. for 30 minutes, and the temperature was decreased at a rate of 40° C./minute to obtain a graphite film (C-5).

Example 6: Preparation of Graphite Film (C-6)

A polyimide film (A-0.04) which was cut into a circle shape having a diameter of 8 cm and had a thickness of 0.04 μm was heated at 800° C. at a rate of 10° C./minute using an electric furnace in a nitrogen gas, kept 800° C. for one hour, and then naturally cooled. The resultant film was sandwiched between the carbonized frames (B-1000) from both sides to prepare an assembly of the carbonized frame and the polyimide film as an intermediary body. The intermediary body was heated to 1000° C. at a rate of −10° C./minute using an electric furnace in a nitrogen gas while a load of 1.0 kgf/cm$^2$ was applied, kept 1000° C. for one hour, and was carbonized to obtain a carbonized intermediary body.

Then, the carbonized film was set into a graphitizing furnace together with the carbonized frame, was heated to 2900° C. at a rate of 20° C./minute in an argon gas atmosphere while a gauge pressure of 0.10 MPa (1.0 kgf/cm$^2$) was applied, kept 2900° C. for 30 minutes, and the temperature was decreased at a rate of 40° C./minute to obtain a graphite film (C-6).

Example 7: Preparation of Graphite Film (C-7)

A polyimide film (A-0.4) which was cut into a circle shape having a diameter of 8 cm and had a thickness of 0.40 μm was heated at 500° C. at a rate of 10° C./minute using an electric furnace in a nitrogen gas, kept 500° C. for one hour, and then naturally cooled. The resultant film was sandwiched between the carbonized frames (B-1000) from both sides to prepare an assembly of the carbonized frame and the polyimide film as an intermediary body. The intermediary body was heated to 1000° C. at a rate of 10° C./minute using an electric furnace in a nitrogen gas while a load of 1.0 kgf/cm$^2$ was applied, kept 1000° C. for one hour, and was carbonized to obtain a carbonized intermediary body.

Then, the carbonized film was set into a graphitizing furnace together with the carbonized frame, was heated to 2900° C. at a rate of 20° C./minute in an argon gas atmosphere while a gauge pressure of 0.10 MPa (1.0 kgf/cm$^2$) was applied, kept 2900° C. for 30 minutes, and the temperature was decreased at a rate of 40° C./minute to obtain a graphite film (C-7).

Example 8: Preparation of Graphite Film (C-8)

A polyimide film (A-4.0) which was cut into a circle shape having a diameter of 8 cm and had a thickness of 4.00

μm was heated at 500° C. at a rate of 10° C./minute using an electric furnace in a nitrogen gas, kept 500° C. for one hour, and then naturally cooled. The resultant film was sandwiched between the carbonized frames (B-1000) from both sides prepare an assembly of the carbonized frame and the polyimide film as an intermediary body. The intermediary body was heated to 1000° C. at a rate of 10° C./minute using an electric furnace in a nitrogen gas while a load of 1.0 kgf/cm$^2$ was applied, kept 1000° C. for one hour, and was carbonized to obtain a carbonized intermediary body.

Then, the carbonized film was set into a graphitizing furnace together with the carbonized frame, was heated to 2900° C. at a rate of 20° C./minute in an argon gas atmosphere while a gauge pressure of 0.10 MPa (1.0 kgf/cm$^2$) was applied, kept 2900° C. for 30 minutes, and the temperature was decreased at a rate of 40° C./minute to obtain a graphite film (C-8).

Example 9: Preparation of Graphite Film (C-9)

A polyimide film (A-0.04) which was cut into a circle shape having a diameter of 8 cm and had a thickness of 0.04 μm was heated at 1000° C. at a rate of 10° C./minute using an electric furnace in a nitrogen gas, kept 1000° C. for one hour, and then naturally cooled. The resultant carbonized film was heated to a 2500° C. at a rate of 20° C./minute using a graphitizing furnace in a nitrogen gas, kept 2500° C. for one hour to obtain a poorly graphitized film.

The resultant poorly graphitized film was sandwiched between the carbonized frames (B-1000) from both sides to prepare an assembly of the carbonized frame and the poorly graphitized film as an intermediary body. The intermediary body was set to the graphitizing furnace, and heated to 2900° C. at a rate of 20° C./minute in an argon gas atmosphere while a gauge pressure of 0.10 MPa (1.0 kgf/cm$^2$) was applied, kept 2900° C. for 30 minutes, and the temperature was decreased at a rate of 40° C./minute to obtain a graphite film (C-9).

Comparative Example 1: Preparation of Graphite Film (D-1)

A polyimide film (A-0.04) which was cut into a circle shape having a diameter of 8 cm and had a thickness of 0.04 μm was heated at 1000° C. at a rate of 10° C./minute using an electric furnace in a nitrogen gas, kept 1000° C. for one hour, and then naturally cooled. The resultant film was sandwiched between the carbonized frames (B-1500) from both sides to prepare an assembly of the carbonized frame and the polyimide film as an intermediary body. The intermediary body was heated to 1000° C. at a rate of 10° C./minute using an electric furnace in a nitrogen gas while a load of 1.0 kgf/cm$^2$ was applied, kept 1000° C. for one hour, and was carbonized to obtain a carbonized intermediary body.

Then, the carbonized film was set into a graphitizing furnace together with the carbonized frame, was heated to 2900° C. at a rate of 20° C./minute in an argon gas atmosphere while a gauge pressure of 0.10 MPa (1.0 kgf/cm$^2$) was applied, kept 2900° C. for 30 minutes, and the temperature was decreased at a rate of 40° C./minute to obtain a graphite film (D-1).

Comparative Example 2: Preparation of Graphite Film (D-2)

A polyimide film (A-2.2) which was cut into a circle shape having a diameter of 8 cm and had a thickness of 2.20 μm was heated at 1000° C. at a rate of 10° C./minute using an electric furnace in a nitrogen gas, kept 1000° C. for one hour, and then naturally cooled. The resultant film was sandwiched between the carbonized frames (B-1000) from both sides to prepare an assembly of the carbonized frame and the polyimide film as an intermediary body. The intermediary body was heated to 1000° C. at a rate of 10° C./minute using an electric furnace in a nitrogen gas while a load of 1.0 kgf/cm$^2$ was applied, kept 1000° C. for one hour, and was carbonized to obtain a carbonized intermediary body.

Then, the carbonized film was set into a graphitizing furnace together with the carbonized frame, was heated to 2900° C. at a rate of 20° C./minute in an argon gas atmosphere while a gauge pressure of 0.10 MPa (1.0 kgf/cm$^2$) was applied, kept 2900° C. for 30 minutes, and the temperature was decreased at a rate of 40° C./minute to obtain a graphite film (D-2).

Comparative Example 3: Preparation of Graphite Film (D-3)

A polyimide film (A-0.04) which was cut into a circle shape having a diameter of 8 cm and had a thickness of 0.04 μm was heated at 1000° C. at a rate of 10° C./minute using an electric furnace in a nitrogen gas, kept 1000° C. for one hour, and then naturally cooled. The resultant film was sandwiched between the carbonized frames (B-750) from both sides to prepare an assembly of the carbonized frame and the polyimide film as an intermediary body. The intermediary body was heated to 1000° C. at a rate of 10° C./minute using an electric furnace in a nitrogen gas while a load of 1.0 kgf/cm$^2$ was applied, kept 1000° C. for one hour, and was carbonized to obtain a carbonized intermediary body.

Then, the carbonized film was set into a graphitizing furnace together with the carbonized frame, was heated to 2900° C. at a rate of 20° C./minute in an argon gas atmosphere while a gauge pressure of 0.10 MPa (1.0 kgf/cm$^2$) was applied, kept 2900° C. for 30 minutes, and the temperature was decreased at a rate of 40° C./minute to obtain a graphite film (D-3).

Comparative Example 4: Preparation of Graphite Film (D-4)

A polyimide film (A-0.04) which was cut into a circle shape having a diameter of 8 cm and had a thickness of 0.04 μm was sandwiched between polyimide frames (A-25) which were cut into a ring shape of an outer diameter of 8 cm and an inner diameter of 4 cm from both sides to prepare an assembly of the polyimide frame and the polyimide film as an intermediary body. The intermediary body was heated to 1000° C. at a rate of 10° C./minute using an electric furnace in a nitrogen gas while a load of 1.0 kgf/cm$^2$ was applied, kept 1000° C. for one hour, and was carbonized to obtain a carbonized intermediary body.

Then, the carbonized film was set into a graphitizing furnace together with the carbonized frame, was heated to 2900° C. at a rate of 20° C./minute in an argon gas atmosphere while a gauge pressure of 0.10 MPa (1.0 kgf/cm$^2$) was applied, kept 2900° C. for 30 minutes, and the temperature was decreased at a rate of 40° C./minute to obtain a graphite film (D-4).

Comparative Example 5: Preparation of Graphite Film (D-5)

A polyimide film (A-0.04) which was cut into a circle shape having a diameter of 8 cm and had a thickness of 0.04

μm was heated at 800° C. at a rate of 10° C./minute using an electric furnace in a nitrogen gas, kept 800° C. for one hour, and then naturally cooled. The resultant film was sandwiched between polyimide frames (A-25) which were cut into a ring shape of an outer diameter of 8 cm and an inner diameter of 4 cm from both sides to prepare an assembly of the polyimide frame and the polyimide film as an intermediary body. The intermediary body was heated to 1000° C. at a rate of 10° C./minute using an electric furnace in a nitrogen gas while a load of 1.0 kgf/cm² was applied, kept 1000° C. for one hour, and was carbonized to obtain a carbonized intermediary body.

Then, the carbonized film was set into a graphitizing furnace together with the carbonized frame, was heated to 2900° C. at a rate of 20° C./minute in an argon gas atmosphere while a gauge pressure of 0.10 MPa (1.0 kgf/cm²) was applied, kept 2900° C. for 30 minutes, and the temperature was decreased at a rate of 40° C./minute to obtain a graphite film (D-5).

Thickness (μm) surface roughness Sa (nm), and electric conductivity (S/cm) of graphite films (C-1) to (C-9) manufactured in Examples 1 to 9 and graphite films (D-1) to (D-5) manufactured in Comparative Examples 1 to 5 are show in Table 1.

TABLE 1

| | Frame | Film | | | | | |
|---|---|---|---|---|---|---|---|
| | Temperature for carbonization Ta (° C.) | Thickness of polyimide (μm) | Condition for carbonization | | | Condition for graphitization | |
| | | | Temperature Tb (° C.) Tb' (° C.) | Ta > Tb | Tb < Td | Temperature Tc (° C.) | Tc < Te |
| Example 1 | 1,000 | 0.04 | Absence of carbonization | | | Absence of graphitization | |
| Example 2 | 750 | 0.04 | 500 | ○ | ○ | Absence of graphitization | |
| Example 3 | 1,000 | 0.04 | 500 | ○ | ○ | Absence of graphitization | |
| Example 4 | 1,500 | 0.04 | 500 | ○ | ○ | Absence of graphitization | |
| Example 5 | 1,000 | 0.04 | 600 | ○ | ○ | Absence of graphitization | |
| Example 6 | 1,000 | 0.04 | 800 | ○ | ○ | Absence of graphitization | |
| Example 7 | 1,000 | 0.40 | 500 | ○ | ○ | Absence of graphitization | |
| Example 8 | 1,000 | 4.00 | 500 | ○ | ○ | Absence of graphitization | |
| Example 9 | 1,000 | 0.04 | 1,000 | Graphitization | | 2500 | ○ |
| Comparative Example 1 | 1,500 | 0.04 | 1,000 | ○ | x | Absence of graphitization | |
| Comparative Example 2 | 1,000 | 2.20 | 1,000 | x | x | Absence of graphitization | |
| Comparative Example 3 | 750 | 0.04 | 1,000 | x | x | Absence of graphitization | |
| Comparative Example 4 | Absence of carbonization | 0.04 | Absence of carbonization | | | Absence of graphitization | |
| Comparative Example 5 | Absence of carbonization | 0.04 | 800 | ○ | ○ | Absence of graphitization | |

| | Assembly of frame and film (intermediary body) | | Physical properties of graphite film | | |
|---|---|---|---|---|---|
| | Temperature for carbonization Td (° C.) | Temperature for graphitization Te (° C.) | Surface roughness Sa (nm) | Electrical conductivity (S/cm) | Thickness (μm) |
| Example 1 | 1000 | 2900 | 3 | 22,000 | 0.02 |
| Example 2 | 1000 | 2900 | 10 | 22,000 | 0.02 |
| Example 3 | 1000 | 2900 | 5 | 22,000 | 0.02 |
| Example 4 | 1000 | 2900 | 5 | 22,000 | 0.02 |
| Example 5 | 1000 | 2900 | 10 | 22,000 | 0.02 |
| Example 6 | 1000 | 2900 | 15 | 22,000 | 0.02 |
| Example 7 | 1000 | 2900 | 10 | 20,000 | 0.20 |
| Example 8 | 1000 | 2900 | 15 | 18,000 | 2.00 |
| Example 9 | Already carbonized | 2900 | 15 | 22,000 | 0.02 |
| Comparative Example 1 | 1000 | 2900 | 30 | 22,000 | 0.02 |
| Comparative Example 2 | 1000 | 2900 | 18 | 19,000 | 1.10 |
| Comparative Example 3 | 1000 | 2900 | 50 | 22,000 | 0.02 |
| Comparative Example 4 | 1000 | 2900 | 30 | 22,000 | 0.02 |
| Comparative Example 5 | 1000 | 2900 | 100 | 22,000 | 0.02 |

○ represents that condition Ta > Tb or Tb < Td is satisfied.
x represents that condition Ta > Tb or Tb < Td is not satisfied.

The graphite film can be utilized in a wide field such as a vibrating plate for MEMS, measurement for light intensity distribution with radiation light, a charge converting film, an energy degrader, a fine wiring circuit and the like.

EXPLANATION OF REFERENCE NUMERALS

1 Frame (carbonized frame)
2 Space
3 Frame (carbonized frame)
4 Solid body
5 Film (aromatic polyimide film, poorly carbonized film, or poorly graphitized film)

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

The invention claimed is:

1. A method for preparing a graphite film comprising steps of:
preparing a carbonized frame carbonized at a temperature Ta, and an aromatic polyimide film or a carbonized film of the aromatic polyimide film carbonized at a temperature Tb,
assembling the carbonized frame and the aromatic polyimide film or the carbonized film of the aromatic polyimide film into an intermediary body 1,
carbonizing the intermediary body 1 at a temperature Td to produce a carbonized intermediary body, and
graphitizing the carbonized intermediary body to produce the graphite film,
wherein:
the temperature Ta is larger than the temperature Tb and the temperature Tb is smaller than the temperature Td, and
the graphite film has a surface roughness expressed as an arithmetic mean height Sa of less than 18 nm, a thickness of 5 nm or more and less than 10 μm, and an area of 1.0 cm$^2$ or more and less than 500 cm$^2$.

2. The method according to claim 1, wherein the aromatic polyimide film has a thickness of 10 nm or more and less than 20 μm.

3. The method according to claim 2, wherein the temperature Ta for carbonization is 500° C. or higher and lower than 2000° C.

4. The method according to claim 2, wherein the graphite film has an electrical conductivity of 8000 S/cm or more and 26000 S/cm or less in a film direction.

5. The method according to claim 2, wherein the carbonized frame is obtained by carbonizing the aromatic polyimide film having a thickness of 10 to 100 μm in an inert gas.

6. The method according to claim 2, wherein the intermediary body 1 is carbonized or graphitized with applying a load to the carbonized frame.

7. The method according to claim 2, wherein the carbonized frame extends after the graphitization, compared with the carbonized frame before the graphitization.

8. The method according to claim 1, wherein the temperature Ta for carbonization is 500° C. or higher and lower than 2000° C.

9. The method according to claim 1, wherein the graphite film has an electrical conductivity of 8000 S/cm or more and 26000 S/cm or less in a film direction.

10. The method according to claim 1, wherein the carbonized frame is obtained by carbonizing the aromatic polyimide film having a thickness of 10 to 100 μm in an inert gas.

11. The method according to claim 1, wherein the intermediary body 1 or an intermediary body 2 is carbonized or graphitized with applying a load to the carbonized frame.

12. The method according to claim 1, wherein the carbonized frame extends after the graphitization, compared with the carbonized frame before the graphitization.

13. A method for preparing a graphite film comprising steps of:
preparing a carbonized frame carbonized at a temperature Ta and a graphitized film graphitized at a temperature Tc,
assembling the carbonized frame and the graphitized film into an intermediary body 2, and
graphitizing the intermediary body 2 at a temperature Te to produce the graphite film,
wherein:
the temperature Tc is smaller than the temperature Te, and
the graphite film has a surface roughness expressed as an arithmetic mean height Sa of less than 18 nm, a thickness of 5 nm or more and less than 10 μm, and an area of 1.0 cm$^2$ or more and less than 500 cm$^2$.

14. The method according to claim 13, wherein the temperature Tc for the graphitization is 2000° C. or higher and 2800° C. or lower.

15. The method according to claim 1, wherein the intermediary body 2 is carbonized or graphitized with applying a load to the carbonized frame.

16. The method according to claim 14, wherein the carbonized frame extends after the graphitization, compared with the carbonized frame before the graphitization.

17. The method according to claim 13, wherein the graphite film has an electrical conductivity of 8000 S/cm or more and 26000 S/cm or less in a film direction.

18. The method according to claim 13, wherein the carbonized frame is obtained by carbonizing an aromatic polyimide film having a thickness of 10 to 100 μm in an inert gas.

19. The method according to claim 13, wherein the intermediary body 2 is carbonized or graphitized with applying a load to the carbonized frame.

20. The method according to claim 13, wherein the carbonized frame extends after the graphitization, compared with the carbonized frame before the graphitization.

* * * * *